(12) United States Patent
Kadohiro

(10) Patent No.: US 7,203,812 B2
(45) Date of Patent: Apr. 10, 2007

(54) MEMORY POOL MANAGEMENT METHOD AND SYSTEM CAPABLE OF USING MEMORY EFFICIENTLY

(75) Inventor: Takashi Kadohiro, Tokyo (JP)

(73) Assignee: NEC Corporation, Tokyo (JP)

( * ) Notice: Subject to any disclaimer, the term of this patent is extended or adjusted under 35 U.S.C. 154(b) by 455 days.

(21) Appl. No.: 10/329,482

(22) Filed: Dec. 27, 2002

(65) Prior Publication Data

US 2004/0128466 A1   Jul. 1, 2004

(30) Foreign Application Priority Data

Dec. 27, 2001   (JP) ............... 2001-397027

(51) Int. Cl.
   *G06F 12/00* (2006.01)
(52) U.S. Cl. .................... 711/171; 711/170
(58) Field of Classification Search ............. 711/170, 711/171

See application file for complete search history.

(56) References Cited

U.S. PATENT DOCUMENTS

| | | | | |
|---|---|---|---|---|
| 4,903,234 | A * | 2/1990 | Sakuraba et al. | 365/49 |
| 5,481,702 | A * | 1/1996 | Takahashi | 707/205 |
| 5,623,654 | A * | 4/1997 | Peterman | 707/206 |
| 5,784,698 | A * | 7/1998 | Brady et al. | 711/171 |
| 5,784,699 | A * | 7/1998 | McMahon et al. | 711/171 |
| 6,804,761 | B1 * | 10/2004 | Chen et al. | 711/170 |
| 2001/0018731 | A1 * | 8/2001 | Fujii et al. | 711/170 |
| 2003/0101324 | A1 * | 5/2003 | Herr et al. | 711/170 |

FOREIGN PATENT DOCUMENTS

| | | |
|---|---|---|
| EP | 0 974 908 A2 | 1/2000 |
| EP | 1 126 373 A2 | 8/2001 |
| JP | 62-283752 A | 12/1987 |
| JP | 64-10365 A | 1/1989 |
| JP | 9-305479 A | 11/1997 |
| JP | 2000-47933 A | 2/2000 |
| JP | 2001-325145 A | 11/2001 |

* cited by examiner

*Primary Examiner*—Brian R. Peugh
*Assistant Examiner*—Matthew Bradley
(74) *Attorney, Agent, or Firm*—Sughrue Mion, PLLC

(57) ABSTRACT

A searching order control portion has a searching order table for a memory pool having sub-memory pools. The searching order table has entries in which request memory area size ranges and corresponding searching orders are entered. The searching order control portion finds the sub-memory pool that should be searched for an assignable memory area by the use of the searching order table in response to a request of a getting request receiving portion. The searching order control portion notifies a sub-memory pool ID of the found sub-memory pool to the getting request receiving portion. The getting request receiving portion makes a getting portion try getting a memory area with request memory area size from the sub-memory pool of the sub-memory pool ID. The getting request receiving portion repeats the above-mentioned operation until the getting portion gets the memory area or the searching order control portion notifies the end of search.

18 Claims, 15 Drawing Sheets

SEARCHING ORDER TABLE FOR MEMORY POOL GROUP A

| REQUEST SIZE | SEARCHING ORDER | WAITING MEMORY POOL ID |
|---|---|---|
| SIZE=<64 | A-1→A-2→A-3→A-4 | A-1 |
| SIZE=<128 | A-2→A-1→A-3→A-4 | A-2 |
| SIZE=<512 | A-3→A-2→A-1→A-4 | A-3 |
| SIZE=>512 | A-4→A-3→A-2→A-1 | A-4 |

MEMORY POOL MANAGEMENT METHOD AND SYSTEM CAPABLE OF USING MEMORY EFFICIENTLY

This application claims priority to prior application JP 2001-397027, the disclosure of which is incorporated herein by reference.

BACKGROUND OF THE INVENTION

This invention relates to a memory pool management method and system for use in a computer or the like.

It is well known that various devices or systems are controlled by software programs. In such a device, a program uses various data when it is executed. Though it is advantageous to high speed executing of the program that all of the data is memorized in a (main) memory, larger memory is markedly expensive. Accordingly, the memory generally has smaller size than necessary size for memorizing all of the data. Therefore, the memory memorizes a necessary part(s) of the data according to a getting request(s) from the program.

When the memory does not have assignable memory area for accepting the getting request from the program, the execution of the program is suspended until the assignable memory area appears in the memory. Accordingly, the memory must be used as efficiently as possible to avoid such situation.

A related memory pool management system is used to utilize a memory efficiently and called a variable length memory pool management system. The memory pool management system permits optional request memory size to a getting request from a program.

Upon receiving a getting request, the memory pool management system searches an available or unoccupied memory area(s) of the memory for an assignable memory area equal to or larger than request memory size. When the assignable memory area is found in the memory, the memory pool management system gets or secures a part or all of the assignable memory area as a secured memory area with the request memory size. The secured memory area is assigned to and occupied by the program. The memory pool management system repeats the above-mentioned operation whenever it receives another getting request.

On the other hand, the memory pool management system releases the occupied memory area occupied by the program in response to a release request from the program to change the occupied area into a reusable memory area. The reusable memory area is the same as the available memory area and unites with adjoining available memory area to form a continuous available memory area.

When the reusable memory area adjoins another occupied memory area, it can be used only for equal or smaller request memory size than the size thereof. Thus, there is a case where the memory pool management system can not accept a new getting request, although a total of the available memory areas is larger than the request size of the new getting request. That is, the memory pool management system has a problem of fragmentation of the available memory areas.

Another related memory pool management system is called a fixed length pool management system. The memory pool management system divides the memory area of the memory into a plurality of memory pools. Each of the memory pools includes a plurality of sub-memory pools of a size. The memory pools are different from one another in their sub-memory pool's size.

The memory pool management system permits specific request memory size to a getting request from a program. The specific request memory size must be equal to the sub-memory pool's size of any one of the memory pools. In other words, the memory pool management system secures and releases the memory area by the sub-memory pool as a unit.

Though the memory pool management system does not have the problem of fragmentation of the available memory areas, it has another problem as follow.

The memory pool management system can not accept a new getting request of the specific request memory size equal to certain sub-memory pool's size when the corresponding memory pool has no available sub-memory pool. This is true even if the other memory pools have enough available memory area(s). That is, the memory pool management system has a problem that there is a case where it can not accept the getting request in spite of enough available memory area. In other words, the memory pools management system has division disadvantage caused by division of memory area.

SUMMARY OF THE INVENTION

It is therefore an object of this invention to provide a memory pool management system capable of using a memory efficiently.

Other object of this invention will become clear as the description proceeds.

According to a first aspect of this invention, a memory pool management method is for getting a memory area from a memory pool having a plurality of sub-memory pools. The method comprises the steps of receiving a memory area getting request specifying request memory area size from a task program; searching the memory pool for an assignable memory area equal to or larger than the request memory area size by the sub-memory pool as a unit in predetermined searching order related to the request memory area size; and getting the memory area with the request memory area size from the assignable memory area when the assignable memory area is found in any one of the sub-memory pools.

According to a second aspect of this invention, a computer program product is for use in a computer to get a memory area from a memory pool having a plurality of sub-memory pools. The computer program product comprises computer readable instructions and a recording medium bearing the computer readable instructions. The instructions is adaptable to enable the computer to operate according to the steps of: receiving a memory area getting request specifying request memory area size from a task program; searching the memory pool for an assignable memory area equal to or larger than the request memory area size by the sub-memory pool as a unit in predetermined searching order related to the request memory area size; and getting the memory area with the request memory area size from the assignable memory area when the assignable memory area is found in any one of the sub-memory pools.

According to a third aspect of this invention, a memory pool management system is for getting a memory area from a memory pool having a plurality of sub-memory pools. The memory pool management system comprises a getting request receiving portion for receiving a memory area getting request specifying request memory area size from a task program. A searching order control portion is connected to the receiving portion to notify a sub-memory pool ID according to a predetermined searching order related to the request memory area size in response to a request of the getting request receiving portion A getting portion is connected to the getting request receiving portion to try getting the memory area with the request memory area size from the sub-memory pool corresponding to the sub-memory pool ID sent from the searching order control portion through the getting request receiving portion.

DESCRIPTION OF THE PREFERRED EMBODIMENTS

Referring to FIGS. 1 to 11, description will be made about a memory pool management system according to a first embodiment of the invention.

In short, the memory pool management system previously divides each memory pool into a plurality of sub-memory pools and searches for an assignable memory area in different searching order corresponding to request memory area size. With this structure, each sub-memory pool has an inclination to be used for a specific range of request memory area size. Therefore, fragmentation of the sub-memory pool is difficult to occur. Furthermore, division of the memory pool into the sub-memory pools does not cause division disadvantage because each sub-memory pool is not only for the specific range of the request memory area size.

Figure 1:
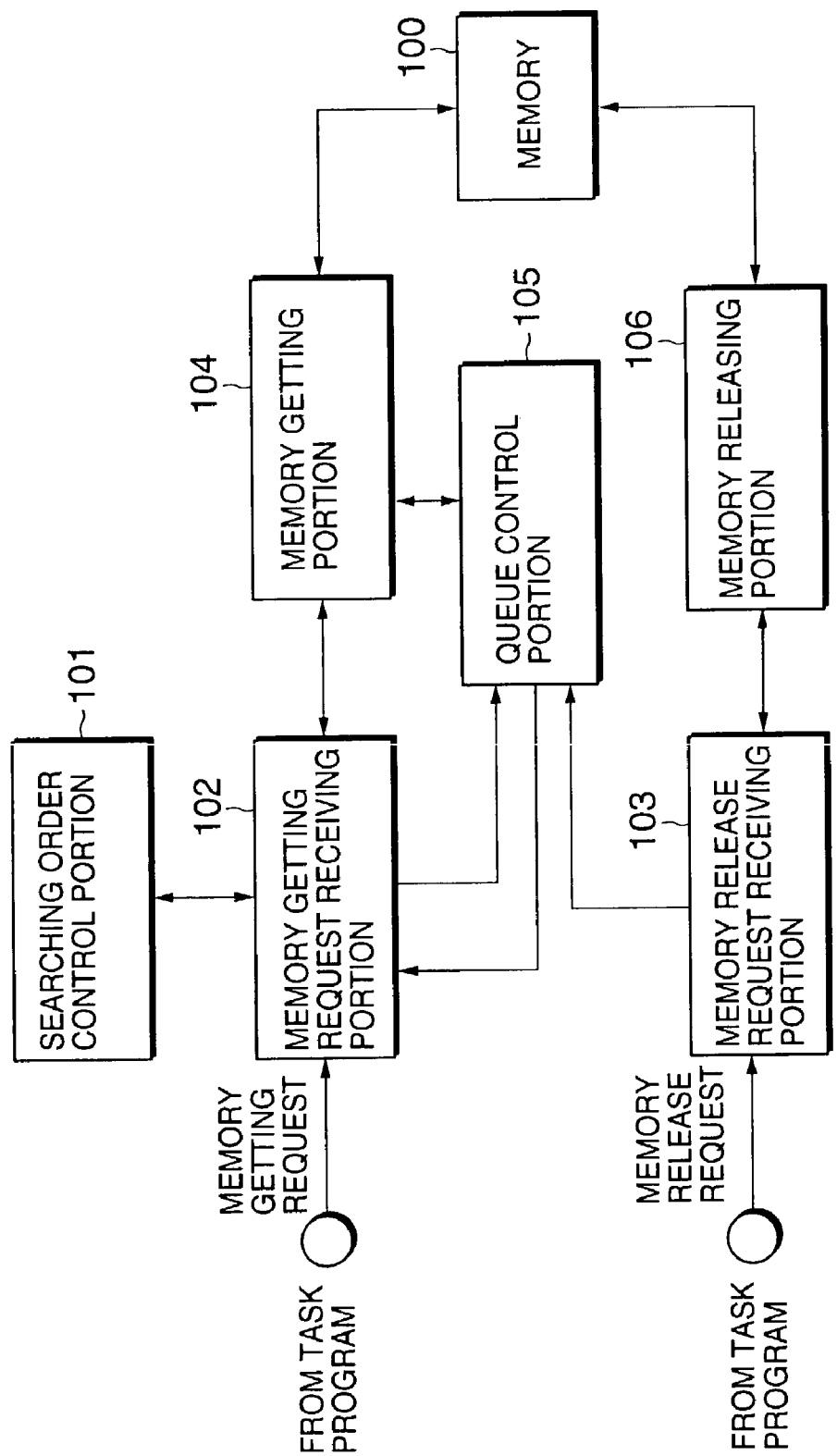
FIG. 1 is a block diagram of a memory pool management system according to a first embodiment of this invention.

In FIG. 1, the memory pool management system is connected to a memory 100 and comprises a searching order control portion 101, a memory getting request receiving portion 102, a memory release request receiving portion 103, a memory getting portion 104, a queue control portion 105, and a memory releasing portion 106.

The searching order control portion 101 is for controlling order of searching the sub-memory pools of the memory pool in the memory 100 for the assignable memory area. The searching order control portion 101 notifies the searching order to the memory getting request receiving portion 102 in response to a request from the memory getting request receiving portion 102. In other words, the searching order control portion 101 notifies the sub-memory pool which should be searched to the memory getting request receiving portion 102.

The memory getting request receiving portion 102 is for receiving a memory getting request from a task program. Upon receiving the memory getting request, the memory getting request receiving portion 102 asks the searching order of the searching order control portion 101. The memory getting request receiving portion 102 further makes the memory getting portion 104 try to get or secure the assignable memory area with the request memory area size from or in a first sub-memory pool decided by the searching order notified from the searching control portion 101. In a case where the assignable memory area is not secured in the first sub-memory pool, the memory getting request receiving portion 102 makes the memory getting portion 104 try to secure the assignable memory area with the request memory area size in the remaining sub-memory pools one by one according to the searching order.

The memory getting portion 104 is for getting or securing the assignable memory area with the request memory area size as a secured memory area from or in a specified sub-memory pool specified by the memory getting request receiving portion 102. When the assignable memory area is not secured in the specified sub-memory pool, the memory getting portion 104 notifies the memory getting request receiving portion 102 of failure.

The memory release request receiving portion 103 is for receiving a release request from the task program. The memory release request receiving portion 103 makes the memory releasing portion 106 release the secured memory area. Simultaneously, the memory release request receiving portion 103 notifies release of the secured memory area to the queue control portion 105.

The memory releasing portion 106 is for releasing the secured memory area.

The queue control portion 105 is for putting the task program in waiting or sleeping state until the assignable memory area appears in the memory pool when the memory securing request is not accepted. The queue control portion 105 notifies the release of the secured memory area to the task program waiting appearance of the available memory area. In other words, the queue control portion 105 wakes the task program when the assignable memory area appears.

Next, the description will be made about a structure of memory area of the memory 100 and searching order tables hold by the searching order control portion 101.

Figures 2, 3:
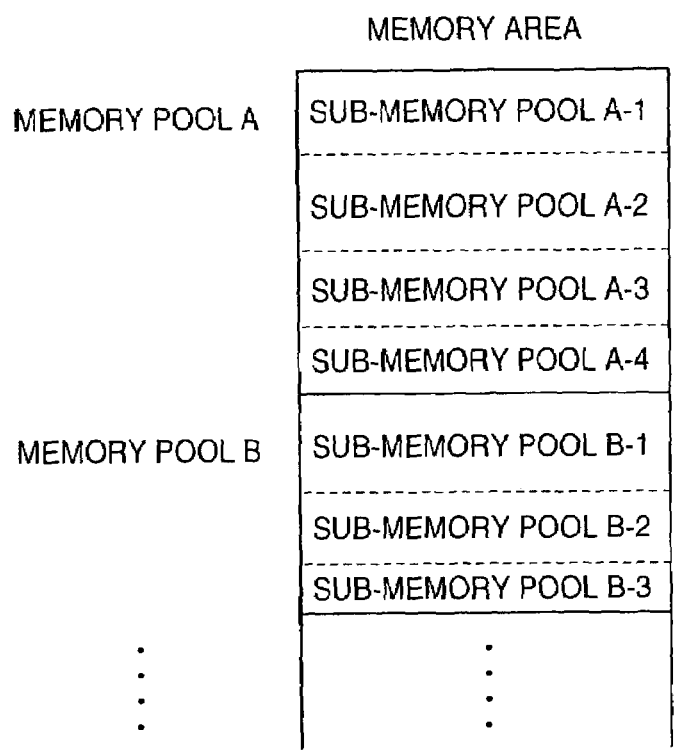
FIG. 2 shows structure of memory pools in a memory managed by the memory pool management system of FIG. 1.
FIG. 3 is a searching order table used in the memory pool management system of FIG. 1 to search for an assignable memory area.

FIG. 2 shows the structure of the memory area of the memory 100. As shown in FIG. 2, the memory area provides a plurality of memory pools (A, B, . . . ). Each of the memory pools is divided into a plurality of sub-memory pools. In this embodiment, the memory pool A is divided into four sub-memory pools A-1, A-2, A-3 and A-4 while the memory pool B is divided into three sub-memory pools B-1, B-2 and B3. In each memory pool, the sub-memory pools are different from one another in size. However, the sub-memory pools may have the same size in each memory pool.

FIG. 3 shows an example of the searching order tables held by the searching order control portion 101. The searching order table is for searching order of the memory pool A. The searching order table has four entries. The first is for a request memory area size of 64 K bytes or less. The second is for a request memory area size larger than 64 K bytes and equal to or smaller than 128 K bytes. The third is for request memory area size larger than 128 K bytes and equal to or smaller than 512 K bytes. The last is for request memory area size of 512 K bytes and over. For instance, when the request memory area size equal to 256 K bytes, the third entry is used for searching the memory pool A for the assignable memory area. These entries are made to deal with any size of the request memory area size. The other searching order tables that are held by the searching order control portion 101 correspond to the remaining memory pools individually. That is, each searching order table defines searching order of the corresponding memory pool. The other searching order tables may be different from the searching order table of FIG. 3 and from one another.

Next, an operation of the memory pool management system will be described in reference to FIGS. 4 to 11 together with FIGS. 1 to 3. Here, the memory pool management system controls plural tasks by the use of control tables (TCB: Task Control Blocks) corresponding to the tasks individually like a general operating system (or OS).

At first, the task program calls the memory getting request receiving portion to get a memory area. That is, the task program sends a getting request including a memory pool ID and a request memory area size to the memory getting request receiving portion 102. Upon receiving the getting request from the task program, the memory getting request receiving portion 102 operates as illustrated in FIG. 4.

Figure 4:
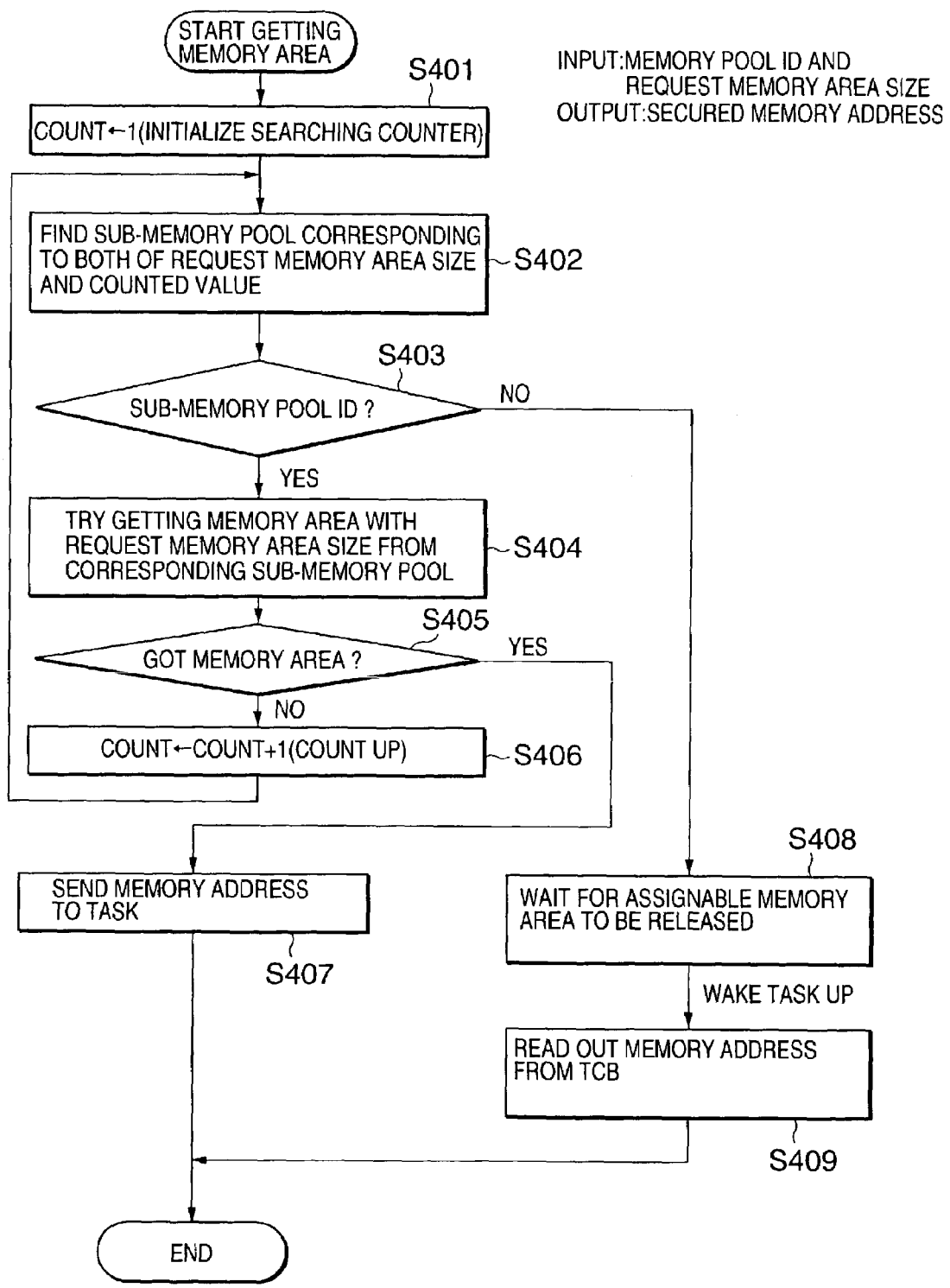
FIG. 4 is a flowchart for describing of an operation of a memory getting request receiving portion provided in the memory pool management system of FIG. 1.

As shown in FIG. 4, the memory getting request receiving portion 102 initializes a searching counter "Count" in a step S401. That is, the memory getting request receiving portion 102 sets "1" in the searching counter "Count" as a counted value.

Next, the memory getting request receiving portion 102 sends the memory pool ID, the request memory area size and the counted value to the searching order control portion 101 in a step S402.

Upon receiving the memory pool ID, the request memory area size and the counted value, the searching order control portion 101 sends a reply to the memory getting request receiving portion 102 in a step S402. The replay represents a sub-memory pool ID of a sub-memory pool which should be searched or no sub-memory pool which should be searched (or end of the search).

When the memory getting request receiving portion 102 receives the replay from the searching order control portion 101, it judges whether the reply represents the sub-memory pool ID or not in a step S403. When the reply represents the sub-memory pool ID, the step S403 goes to a step S404. On the other hand, the step S403 jumps to a step S408 when the replay represents no sub-memory pool which should be searched.

In the step S404, the memory getting request receiving portion 102 sends the sub-memory pool ID and the request memory area size to the memory getting portion 104. The memory getting portion 104 tries to get or secure a memory area with the request memory area size from or in the sub-memory pool to which the sub-memory ID assigned. The memory getting portion 104 notifies a result of the memory getting trial to the memory getting request receiving portion 102. When the memory getting portion 104 has succeeded in the trial, the result represents a memory address(es) of a gotten or secured memory area. When the memory getting portion 104 has failed in the trial, the result represents failure status.

The memory getting request receiving portion 102 judges whether the memory getting portion 104 has succeeded in the trial or not on the basis of the result from the memory getting portion 104 in a step S405. When the result represents the failure status, the step S405 goes to a step S406. When the result represents the memory address(es), the step S405 jumps to a step S407.

In the step S406, the memory getting request receiving portion 102 counts up the searching counter "Count". That is, the memory getting request receiving portion 102 adds "1" to the current counted value to produce a new counted value. Then, the step S406 returns to the step S402.

On the other hand, when the memory getting request receiving portion 102 receives the memory address(es) in the step 405, it sends the memory address(es) to the task program in the step S407.

When no sub-memory pool is notified from the searching order control portion 101 in the step S403, the memory getting request receiving portion 102 sends the memory pool ID and the request memory area size to the queue control portion 105 in the step S408. The queue control portion 105 makes the TCB of the task be queued in a waiting task queue for the memory pool corresponding to the memory pool ID. Therefore, the task waits for the assignable memory area to be found in the memory pool corresponding to the memory pool ID.

When the assignable memory area is found in the memory pool, the queue control portion 105 stores a memory address (es) of the assignable memory area into the TCB and wakes the task up.

The task waked up reads out the memory address(es) of the assignable memory area from the TCB thereof in a step S409. Thus, the task gets and occupies the memory area with the required memory area size.

Figure 5:
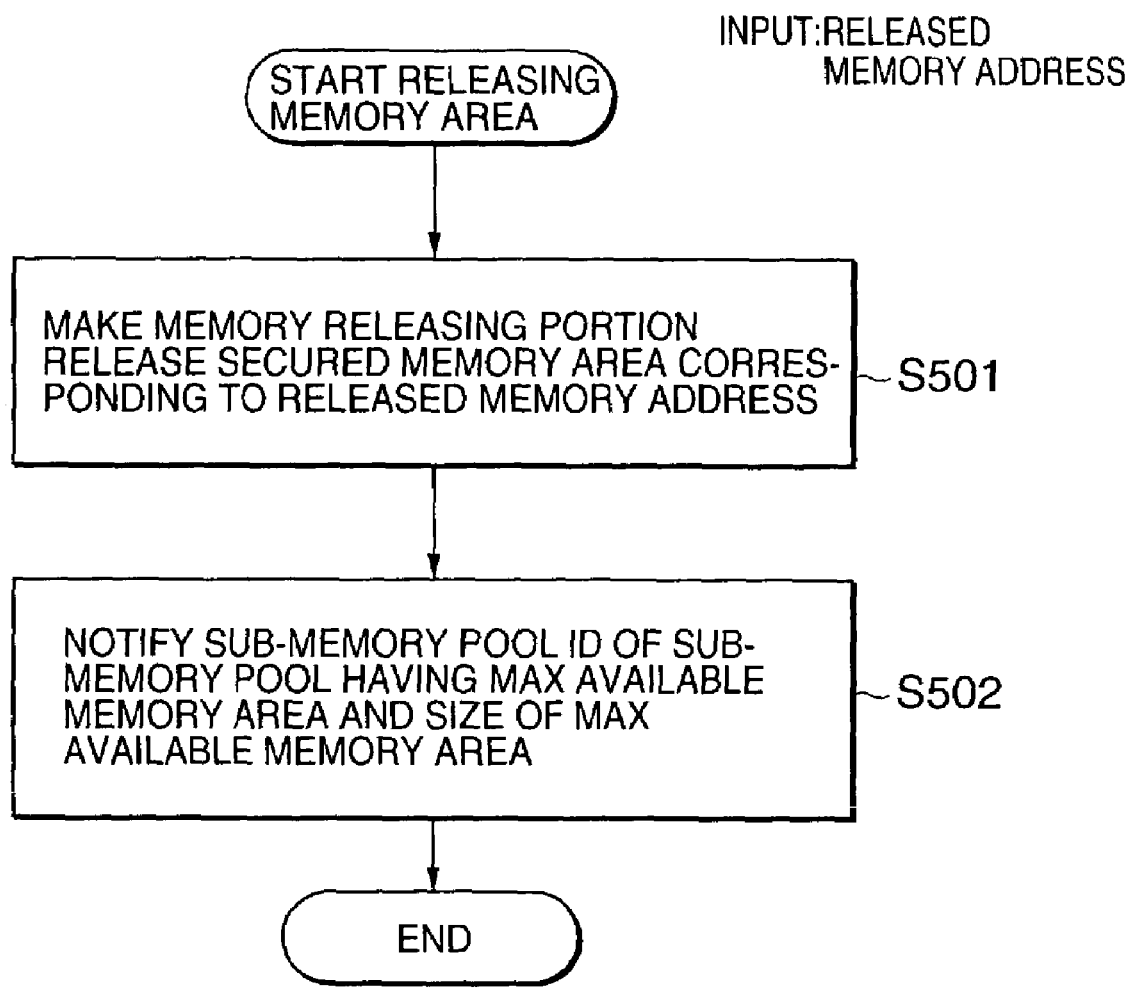
FIG. 5 is a flowchart for describing of an operation of a memory release request receiving portion provided in the memory pool management system of FIG. 1.

Next, the description will be made about a case where the task program calls the memory release request receiving portion 103. In this case the task program sends a release request including a release memory address(es) to the memory release request receiving portion 103. The memory release request receiving portion 103 receives the release request and operates as shown in FIG. 5.

The memory release request receiving portion 103 sends the release memory address(es) to the memory releasing portion 106 to make the memory releasing portion 106 release a secured memory area corresponding to the release memory address(es) in a step S501. The memory releasing portion 106 finds the maximum available memory area which is formed by releasing the secured memory area in the sub-memory pool to which the release memory address(es) belongs. The memory releasing portion 106 sends a sub-memory pool ID of the sub-memory pool including the maximum available memory area and size of the maximum available memory area to the memory release request receiving portion 103.

Upon receiving the sub-memory pool ID and the maximum available memory area size, the memory release request receiving portion 103 notifies them together with a memory pool ID of the memory pool including the sub-memory pool represented by the sub-memory pool ID to the queue control portion 105 in a step S502.

Next, an operation of the searching order control portion 101 called by the memory getting request receiving portion 102 will be made in below.

Figure 6:
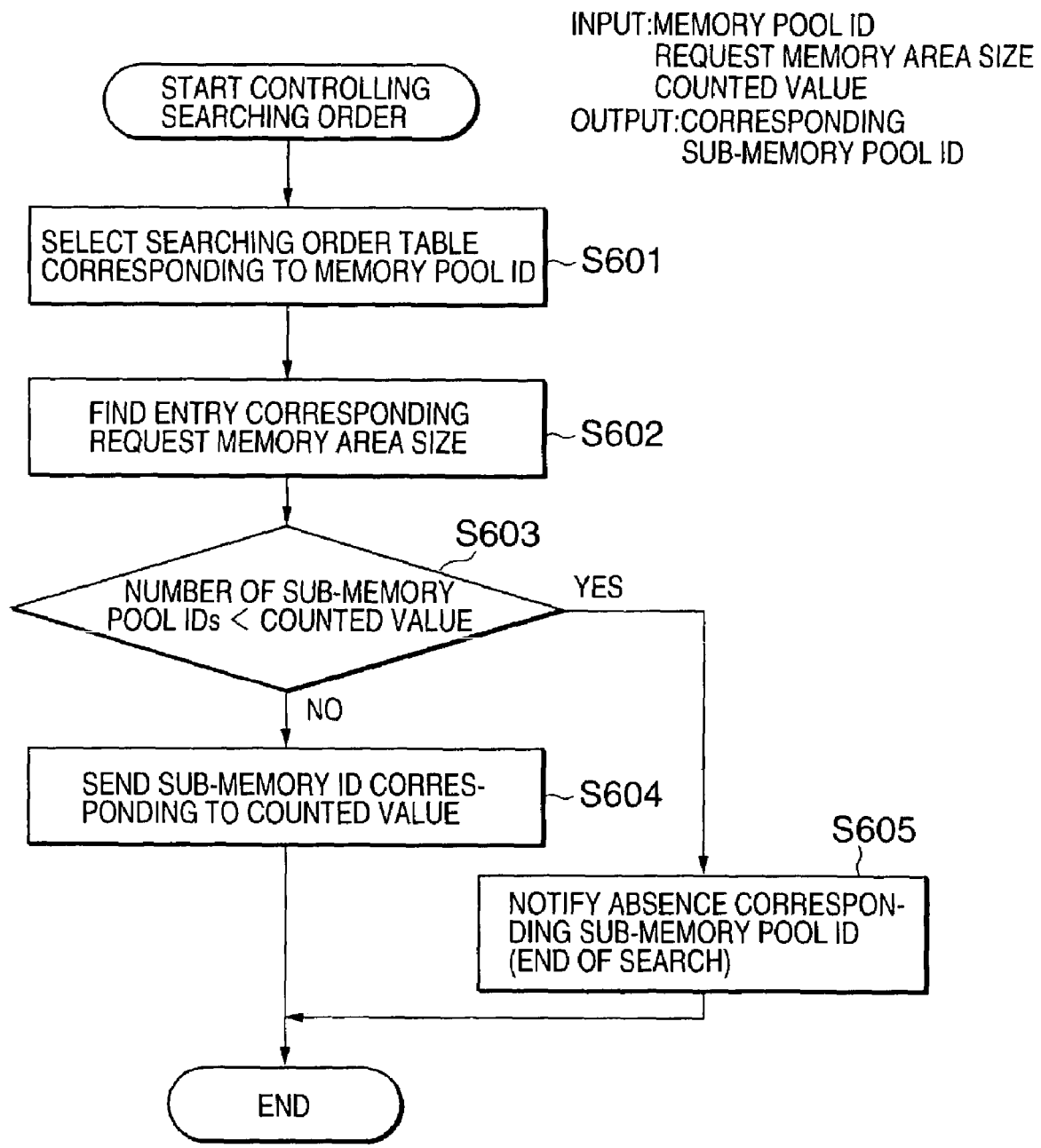
FIG. 6 is a flowchart for describing of an operation of a searching order control portion provided in the memory pool management system of FIG. 1.

When the searching order control portion 101 receives the memory pool ID, the request memory area size and the counted value of "Count" from the memory getting request receiving portion 102, it operates as illustrated in FIG. 6.

In a step S601, the searching order control portion 101 selects one of the searching order tables on the basis of the memory pool ID sent from the memory getting request receiving portion 102.

Next, the searching order control portion 101 finds one of the entries from the selected searching order table on the basis of the request memory area size sent from the memory getting request receiving portion 102 in a step S602.

Subsequently, the searching order control portion 101 judges whether the counted value sent from the memory getting request receiving portion 102 is larger than the number of sub-memory pool IDs in the found entry in a step S603. When the counted value is equal to or smaller than the number of sub-memory pool IDs in the found entry, the step S603 goes to a step S604. In the step S604, the searching order control portion 101 sends a corresponding sub-memory pool ID corresponding to the counted value to the memory getting request receiving portion 102 in the step S604. On the other hand, the counted value is larger than the number of the sub-memory pools, the step S604 jumps to a step S605. In the step S605, the searching order control portion 101 notifies no corresponding sub-memory pool ID to the memory getting request receiving portion 102. In other words, the searching order control portion 101 notifies the end of search to the memory getting request receiving portion 102.

Now, it is assumed that the memory pool ID and the request memory area size sent from the memory getting request receiving portion 102 represent the memory pool A and the size of 256 K bytes, respectively. In this situation, the searching order control portion 101 operates as follows.

First, the searching order control portion 101 selects the searching order table of FIG. 3 because the memory pool ID represents the memory pool A. Next, the searching order control portion 101 selects the third entry of the searching order table because the request memory area size is equal to 256 K bytes.

When the counted value sent from the memory getting request receiving portion 102 is equal to "1", the searching order control portion 101 sends "A-3" to the memory getting request receiving portion 102 as the sub-memory pool ID. IF the counted value is equal to "2", "3" and "4", the searching order control portion 101 sends "A-2", "A-1" and "A-4" respectively. When the counted value is equal to "5", the searching order control portion 101 notifies the end of search to the memory getting request receiving portion 102.

Figure 7:
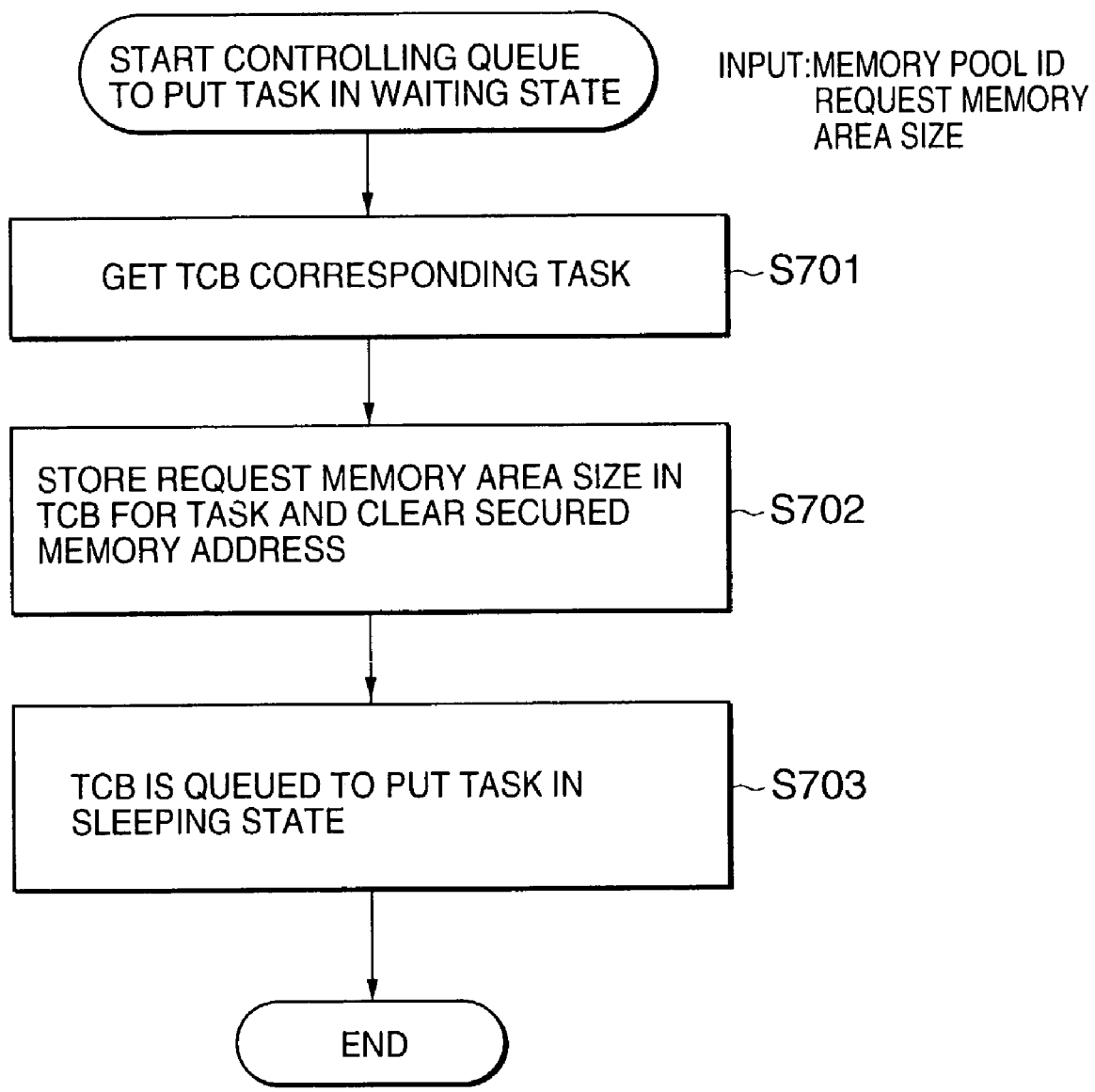
FIG. 7 is a flowchart for describing of an operation of a queue control portion provided in the memory pool management system of FIG. 1 in a case where the queue control portion receives a memory pool ID and request memory area size from the memory getting request receiving portion.
Figure 8:
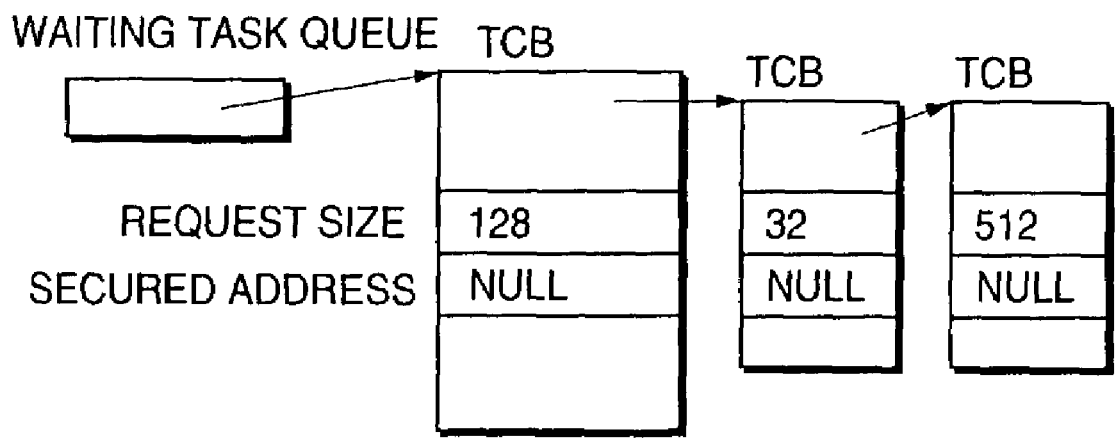
FIG. 8 shows structure of a task control block (TCB) used by the memory pool management system of FIG. 1.
Figure 9:
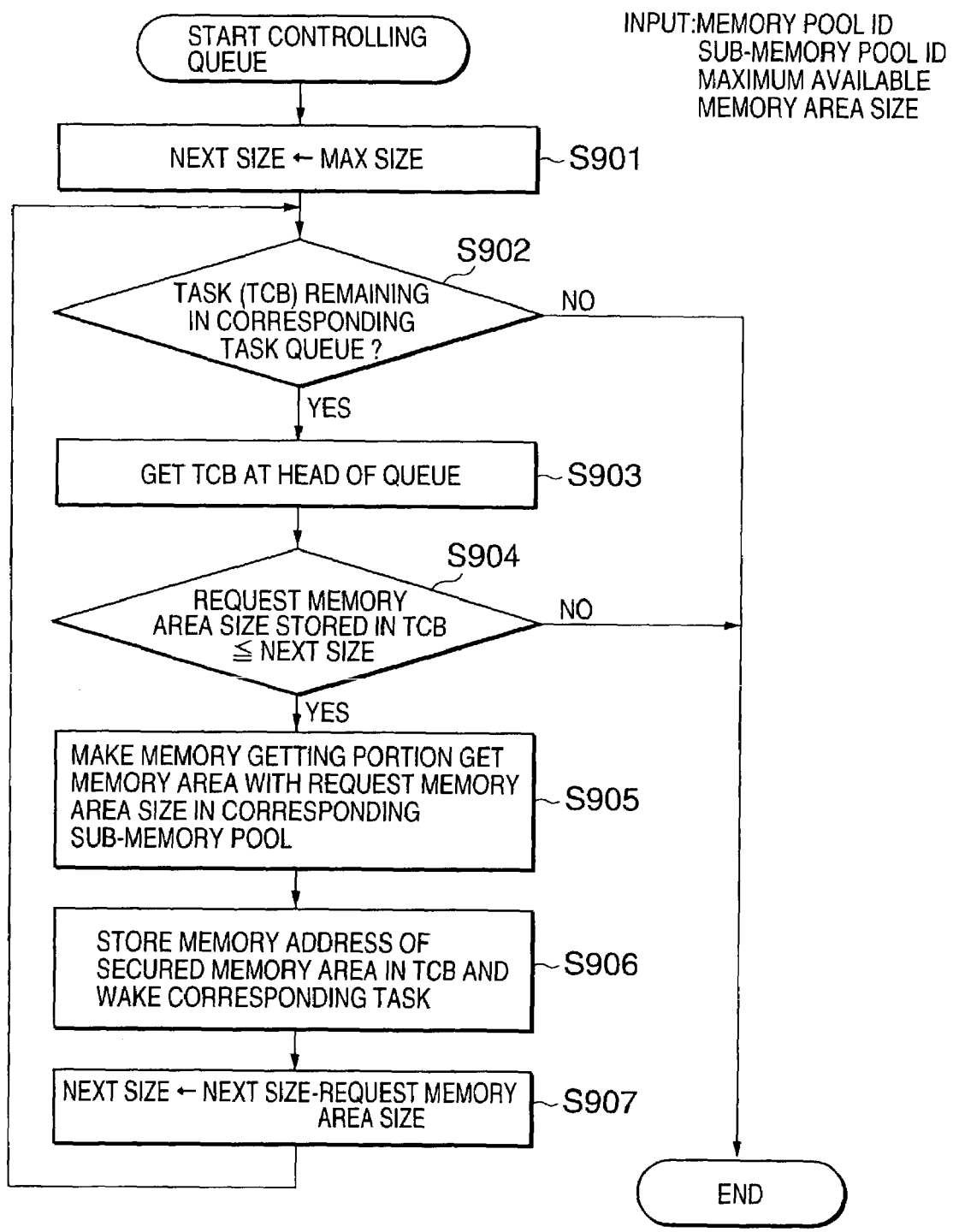
FIG. 9 is a flowchart for describing of an operation of the queue control portion in a case where the queue control portion receives the memory pool ID, a sub-memory pool ID and maximum available memory area size from the memory release request receiving portion.

Next, an operation of the queue control portion 105 is described in reference with FIGS. 7 to 9. The queue control portion 105 operates as shown in FIG. 7 when it called by the memory getting request receiving portion 102 or receives the memory pool ID and the request memory area size from the memory getting request receiving portion 102. Furthermore, the queue control portion 105 operates as illustrated in FIG. 9 when it called by the memory release request receiving portion 103 or receives the memory pool ID, the sub-memory pool ID and the maximum available memory area size from the memory release request receiving portion 103.

As shown in FIG. 7, upon receiving the memory pool ID and the request memory area size from the memory getting request receiving portion 102, the queue control portion 105 gets the TCB corresponding to the task which generates the memory pool ID and the request memory area size in a step S701. The TCB has a first field for storing the request memory area size and a second field for storing the memory address(es) of the assignable memory area as illustrated in FIG. 8.

Next, the queue control portion 105 stores the request memory area size in the first field of the gotten TCB and clears the second field to make it null at a step S702.

Finally, the TCB is queued in the waiting task queue for the memory pool corresponding to the memory pool ID and thereby the task is put in the sleeping state in a step S703. For instance, this TCB is fourth in the case shown in FIG. 8 because three TCBs have been queued. The waiting task queue is dealt by a known method, such as an FIFO method, a method according to task priority and so on. At any late, the waiting task queue is dealt by the use of a scheduler (not shown).

As shown in FIG. 9, the queue control portion 105 substitutes the maximum available memory area size for a "Next Size" in a step S901 when it receives the memory pool ID, the sub-memory pool ID and the maximum available memory area size.

Next, the queue control portion 105 judges whether a TCB remains in the waiting task queue corresponding to the memory pool ID or not in a step S902. When the TCB remains in the waiting task queue, the step S902 goes to a step S903. On the other hand, the step S902 goes to the end when the TCB does not remain in the waiting task queue.

In the step S903, the queue control portion 105 gets the TCB at the head of the waiting task queue.

Next, the queue control portion 105 compares the request memory area size stored in the gotten TCB with the "Next Size" at a step S904. When the request memory area size is equal to or smaller than the "Next Size", the step S904 goes to a step S905. When the request memory area size is lager than the "Next Size", the step S904 goes to the end.

In the step S905, the queue control portion 105 makes the memory getting portion 104 get a memory area with the request memory area size from the sub-memory pool corresponding to the sub-memory pool ID.

Successively, the queue control portion 105 takes out the TCB from the waiting task queue and stores memory address(es) of the secured memory area gotten by the memory getting portion 104 in the second field of the TCB. Furthermore, the queue control portion 105 wakes the task corresponding to the TCB.

Next, the queue control portion 105 subtracts the request memory area size from the "Next Size" to obtain a new "Next Size" at a step S907. Then, the step S907 returns to the step 902.

In this embodiment, the queue control portion 105 considers only the sub-memory pool corresponding to sub-memory pool ID sent from the memory getting request receiving portion 102. However, the other sub-memory pools of the memory pool corresponding to the memory pool ID sent from the memory getting request receiving portion 102 may be considered. This is realizable by making the queue control portion 105 have a maximum size table representing size of a maximum available memory area in each sub-memory pool. In such a case, the queue control portion 105 compares the request memory area size stored in the TCB with the size of the maximum available memory area in each sub-memory pool by the use of the maximum size table in the step S904. In this case, it is desirable that the searching order control portion 101 is used.

Figure 10:
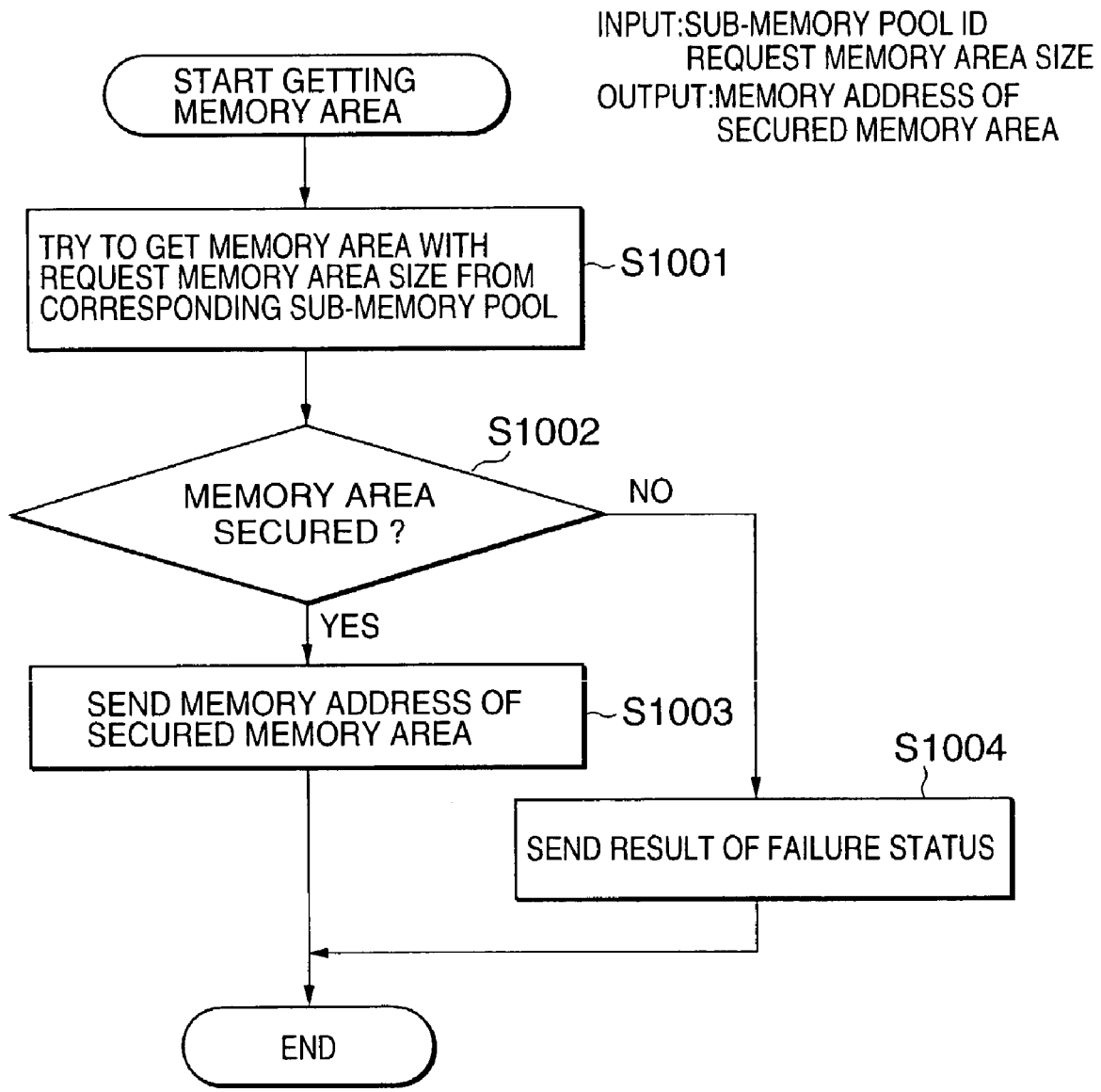
FIG. 10 is a flowchart for describing of an operation of a memory getting portion provided in the memory pool management system of FIG. 1.

Next, an operation of the memory getting portion 104 will be mentioned in reference to FIG. 10.

The memory getting portion 104 receives the sub-memory pool ID and the request memory area size from the memory getting request receiving portion 102 or the queue control portion 105 as mentioned above. Then, the memory getting portion 104 tries to get the memory area with the request memory area size from the sub-memory pool corresponding to the sub-memory pool ID in a step S1001. This trial is executed by the use of a known method.

Next, the memory getting portion 104 judges whether the memory area is secured or not in a step S1002.

When the memory area is secured in the step S1002, the memory getting portion 104 sends the memory address(es) of the secured memory area to the memory getting request receiving portion 102 or the queue control portion 105 in a step S1003.

On the other hand, when the memory area is not secured in the step S1002, the memory getting portion 104 sends the result of the failure status to the memory getting request receiving portion 102 or the queue control portion 105 in a step S1004.

Next, an operation of the memory releasing portion 106 will be described in reference to FIG. 11.

Figure 11:
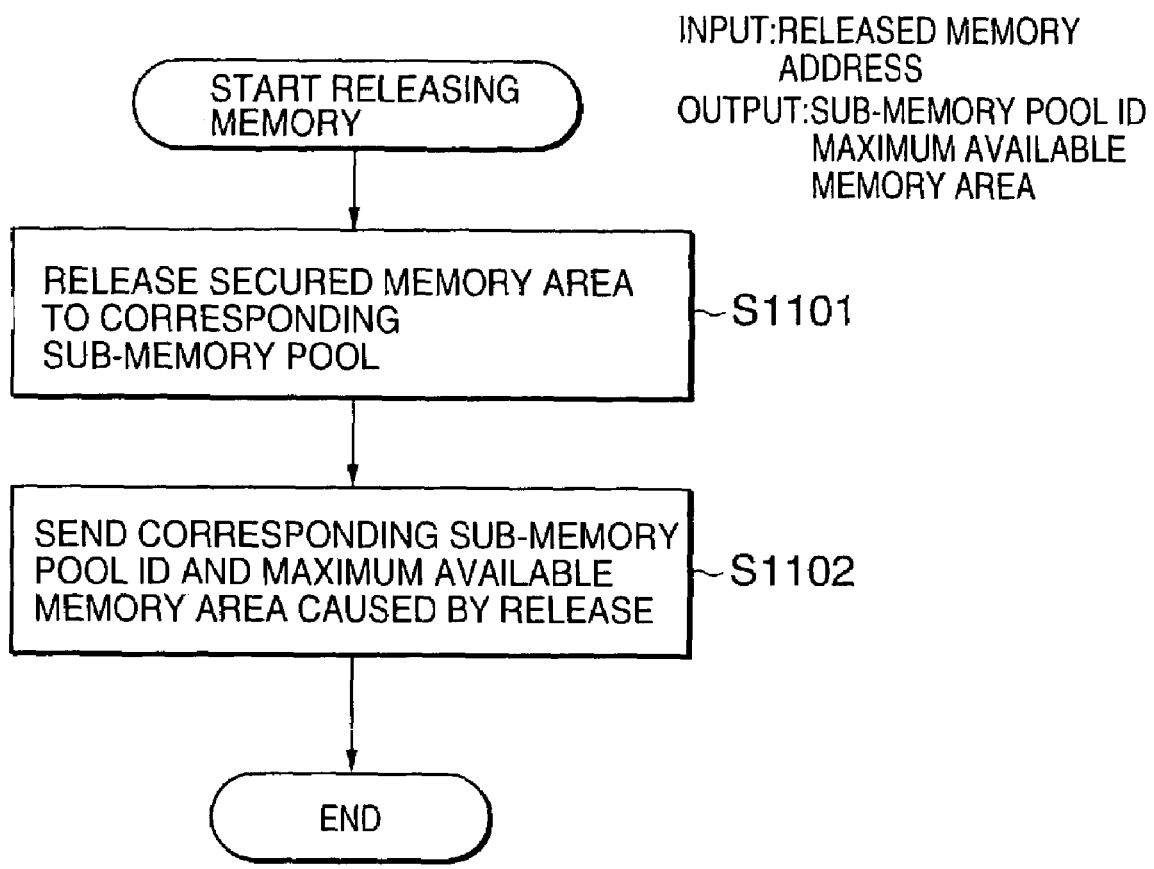
FIG. 11 is a flowchart for describing of an operation of a memory releasing portion provided in the memory pool management system of FIG. 1.

As shown in FIG. 11, the memory releasing portion 106 releases the secured memory area corresponding to the release memory address(es) sent from the memory release request receiving portion 103 at a step S1101.

Next, the memory releasing portion 106 sends the sub-memory pool ID of the sub-memory pool in which the secured memory area of the release memory address(es) is included and the maximum available memory area caused by releasing the secured memory area in a step S1102.

As mentioned above, the memory pool management system of this embodiment searches the memory pool for the assignable memory area equal to or larger than the request memory area size by the sub-memory pool as a unit in predetermined searching order related to the request memory area size. Therefore, the memory pool management system can use the memory 100 efficiently. That is, the memory pool management system can suppress fragmentation of available memory areas and occurrence of the division disadvantage.

The fragmentation is difficult to occur because the searching order against the sub-memory pools depends on the request memory area size and the sub-memory pools in each memory pool are localized with regard to size of secured memory areas.

The division disadvantage does not occur because the searching of the assignable memory area is executed against not only specific one of the sub-memory pools but also the other sub-memory pools entered in the searching order table.

Referring to FIG. 12 to 17, the description will be directed to a memory pool management system according to a second embodiment of the invention.

The memory pool management system is realized by using memory management functions of an operating system which is compliant with standard specifications in an operating system of μ ITRON 3.0 of TRON ASSOCIATION.

Figure 12:
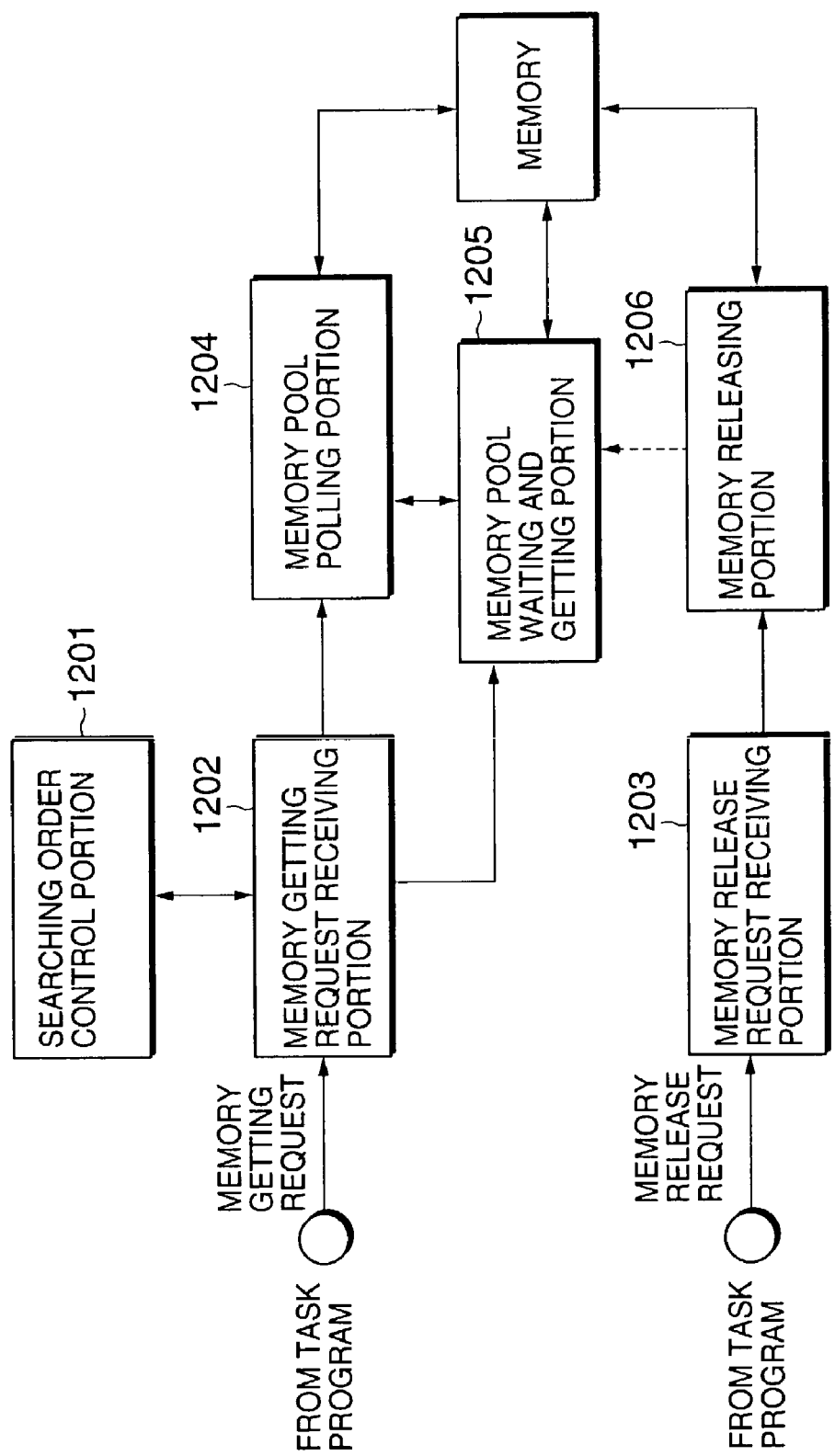
FIG. 12 is a block diagram of a memory pool management system according to a second embodiment of this invention.

FIG. 12 is a block diagram of the memory pool management system. The memory pool management system differs from that of FIG. 1 in having a memory pool polling portion 1204, a memory pool waiting and getting portion 1205 and a memory releasing portion 1206 which are compliant with the standard specifications of the OS μ ITRON 3.0. In the standard specifications of the OS μ ITRON 3.0, the memory pool polling portion 1204, the memory pool waiting and getting portion 1205 and the memory releasing portion are defined as system calls having names of "pget_blk", "get_blk" and "rel_blk" respectively.

Furthermore, the memory pool management system comprises a searching order control portion 1201, a memory getting request receiving portion 1202 and a memory release request receiving portion 1203. The searching order control portion 1201, the memory getting request receiving portion 1202 and the memory release request receiving portion 1203 are similar to those of FIG. 1.

The standard specifications of the OS μ ITRON 3.0 defines a plurality of memory pools in a memory. In this embodiment, the memory pool management system deals with the memory pools as the sub-memory pools of FIG. 2 to form memory pool groups corresponding to the memory pools of FIG. 2 as shown in FIG. 13.

The memory pool management system uses searching order tables to search for assignable memory areas in response to memory getting requests. The searching order tables corresponds to the memory pool groups respectively.

Figures 13, 14:
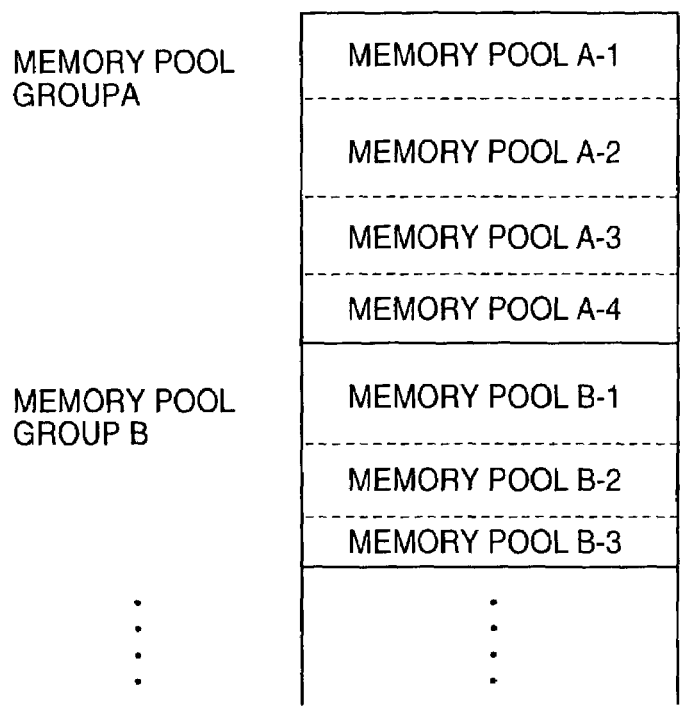
FIG. 13 shows structure of memory groups in a memory managed by the memory pool management system of FIG. 12.
FIG. 14 is a searching order table used in the memory pool management system of FIG. 12 to search for an assignable memory area.

An example of the searching order table is illustrated in FIG. 14. The searching order table is for the memory pool group A. The searching order table differs from that of FIG. 3 in having a column for entering waiting memory pool IDs. The memory pool corresponding to each waiting memory pool ID is searched by the memory pool waiting and getting portion 1205 in a case where the memory pool polling portion 1204 can not find an assignable memory area in corresponding memory pool group. To distinguish the waiting memory pool ID from the memory pool IDs of the regular searching order, the memory pools IDs will be called the regular pool IDs hereinafter. Though the waiting memory pool ID generally corresponds to the first regular pool ID of the searching order in each entry, this is not necessary.

Figure 15:
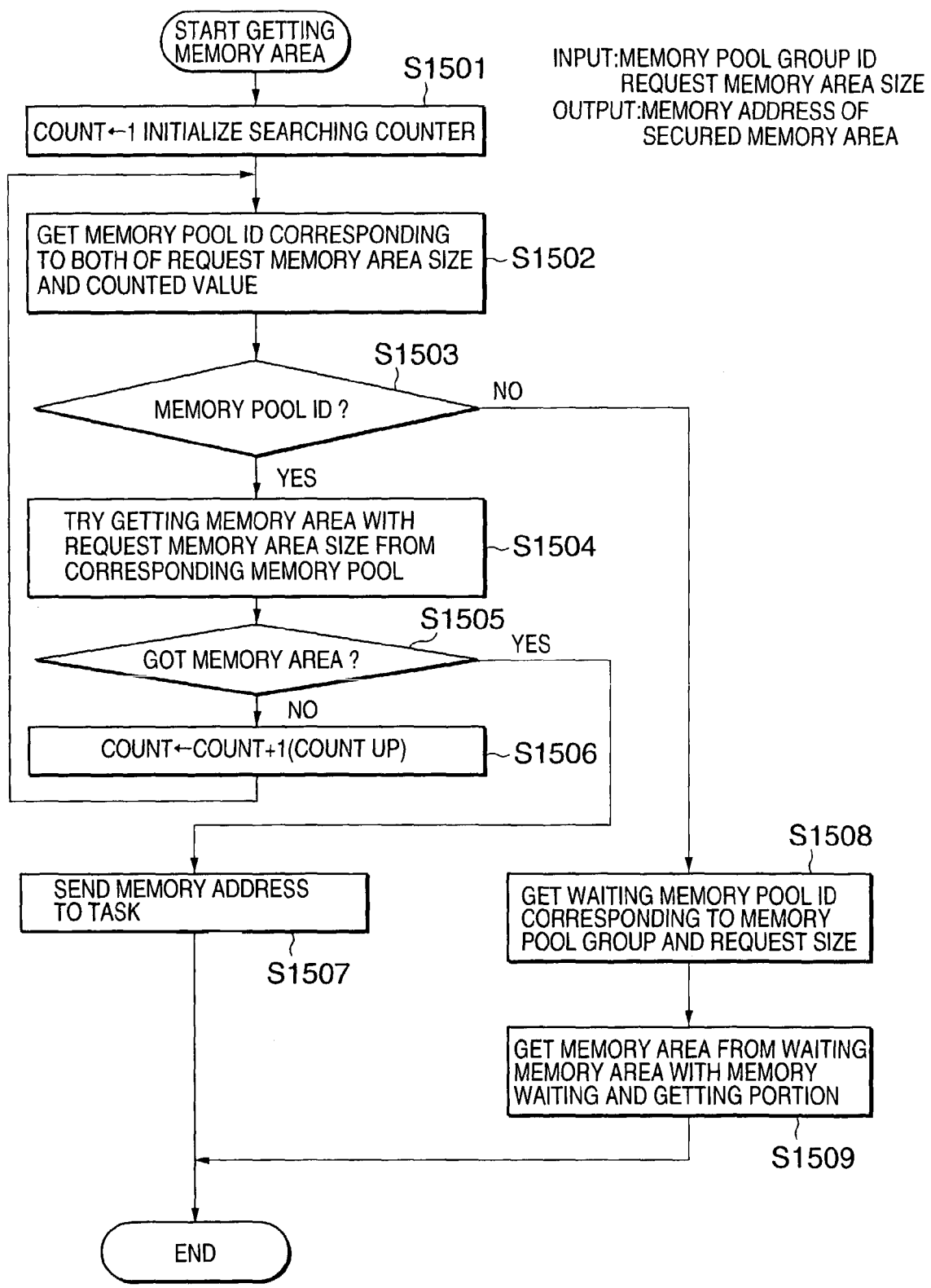
FIG. 15 is a flowchart for describing of an operation of a memory getting request receiving portion provided in the memory pool management system of FIG. 12.

An operation of the memory pool management system will be described in reference to FIGS. 15 to 17 together with FIGS. 12 to 14.

When a task program calls the memory getting request receiving portion 1202, it sends a memory getting request including a memory pool group ID and a request memory area size to the memory getting request receiving portion 1202. Upon receiving the memory getting request the memory getting request receiving portion 1202 operates as illustrated in FIG. 15.

At first, the memory getting request receiving portion 1202 initializes a counted value of a searching counter "Count" in a step S1501.

Next, the memory getting request receiving portion 1202 sends the memory pool group ID, the request memory area size and the counted value to the searching order control portion 1201 in a step S1502.

Upon receiving the memory pool ID, the request memory area size and the counted value, the searching order control portion 1201 sends a reply to the memory getting request receiving portion 1202. The replay represents a memory pool ID of a memory pool which should be searched or no memory pool which should be searched.

When the memory getting request receiving portion 1202 receives the replay from the searching order control portion 1201, it judges whether the reply represents the memory pool ID or not in a step S1503. When the reply represents the memory pool ID, the step S1503 goes to a step S1504. On the other hand, the step S1503 jumps to a step S1508 when the replay represents no memory pool which should be searched.

In the step S1504, the memory getting request receiving portion 1202 sends the memory pool ID and the request memory area size to the memory pool polling portion 1204. The memory pool polling portion 1204 tries to get or secure a memory area with the request memory area size from or in the memory pool to which the sub-memory ID assigned. The memory pool polling portion 1204 notifies a result of the memory getting trial to the memory getting request receiving portion 1202. When the memory pool polling portion 1204 has succeeded in the trial, the result represents a memory address(es) of a gotten or secured memory area. When the memory pool polling portion 1204 has failed in the trial, the result represents failure status.

The memory getting request receiving portion 1202 judges whether the result sent from the memory pool polling portion 1204 represents the failure status or not in a step S1405. When the result represents the failure status, the memory getting request receiving portion 1202 judges that the memory pool polling portion has failed in the trial and the step S1505 goes to a step S1506. When the result represents the memory address(es), the memory getting request receiving portion 1202 judges that the memory pool polling portion has gotten the memory area and the step S1505 jumps to a step S1507.

In the step S1506, the memory getting request receiving portion 1202 counts up the searching counter "Count". That is, the memory getting request receiving portion 1202 adds "1" to the current counted value to produce a new counted value. Then, the step S1506 returns to the step S1502.

On the other hand, when the memory getting request receiving portion 1202 receives the memory address(es) in the step 1505, it sends the memory address(es) to the task program in the step S1507.

When the memory getting request receiving portion 1202 receives the reply representing no memory pool which should be searched in the step S1503, it sends the counted value of "0" together with the memory pool group ID and request memory area size to the searching order control portion 1201 in a step S1508.

Upon receiving the counted value "0", the memory pool group ID, and request memory area size, the searching order control portion 1201 sends a waiting memory pool ID corresponding to both of the memory pool group ID and the request memory area size to the memory getting request receiving portion 1202.

Next, the memory getting request receiving portion 1202 delivers the waiting memory pool ID sent from the searching order control portion 120 together with the request memory area size to the memory pool waiting and getting portion 1205 in a step S2508.

The memory pool waiting and getting portion 1205 having functions realized by the OS μ ITRON 3.0 to wait appearance of the assignable memory area. The memory pool waiting and getting portion 1205 is a substitute for a part of the queue control portion 105 of FIG. 1. The memory pool waiting and getting portion 1205 gets the memory area with the request memory area size when the assignable memory area appears in a waiting memory pool to which the waiting memory pool is assigned.

Figure 16:
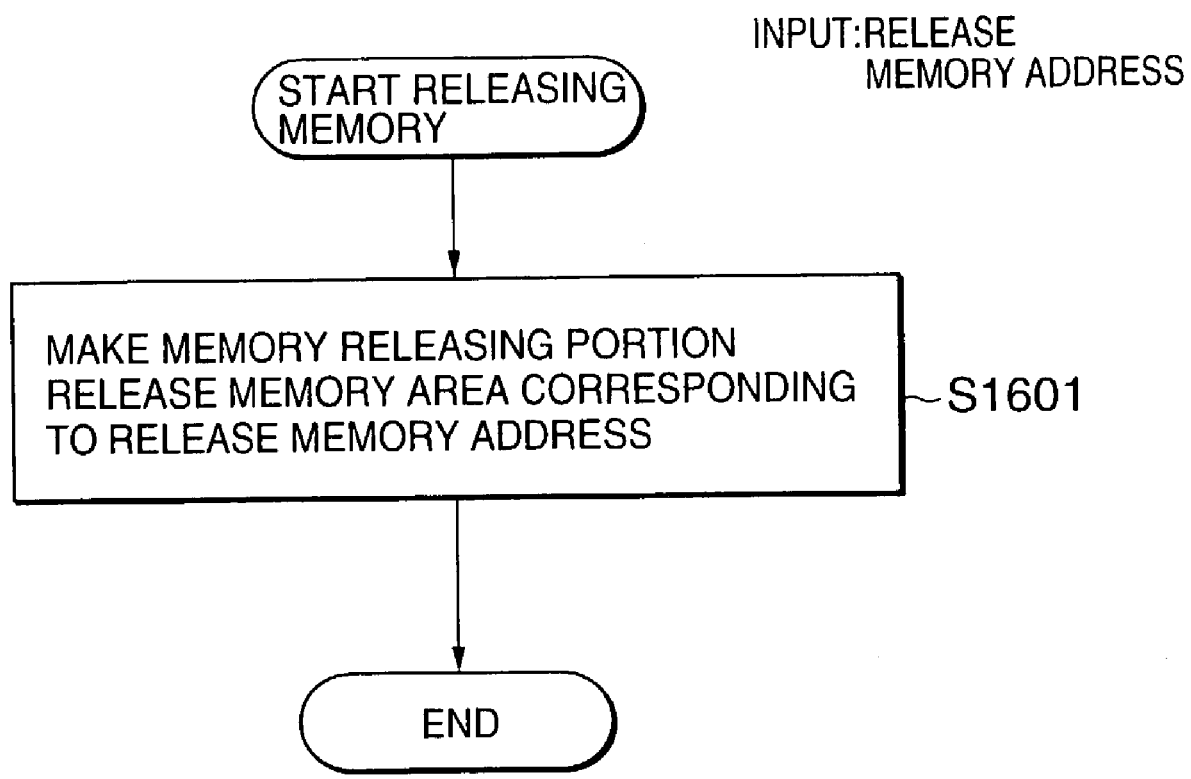
FIG. 16 is a flowchart for describing of an operation of a memory release request receiving portion provided in the memory pool management system of FIG. 12.

Next, an operation of the memory release request receiving portion 1203 called by the task program will be mentioned in reference to FIG. 16.

When the memory release request release request receiving portion 1203 receives a release request including a release memory address(es) from the task, it sends the release memory address(es) to the releasing portion 1206.

Upon receiving the release memory address(es), the memory releasing portion 1206 releases the secured memory area corresponding to the release memory address(es). The memory releasing portion 1206 has functions realized by the OS μ ITORON 3.0 to notify the release of the secured memory area to the memory pool waiting and getting portion 1205. That is, the memory releasing portion 1206 is substitute for another part of the queue control portion 105 of FIG. 1. The notification of releasing the secured memory area may be made only when the memory pool waiting and getting portion 1205 waits appearance of the assignable memory area in the memory pool including the released memory area.

Next, an operation of the searching order control portion 1201 called by the memory getting request receiving portion 1202 will be made in reference to FIG. 17.

Figure 17:
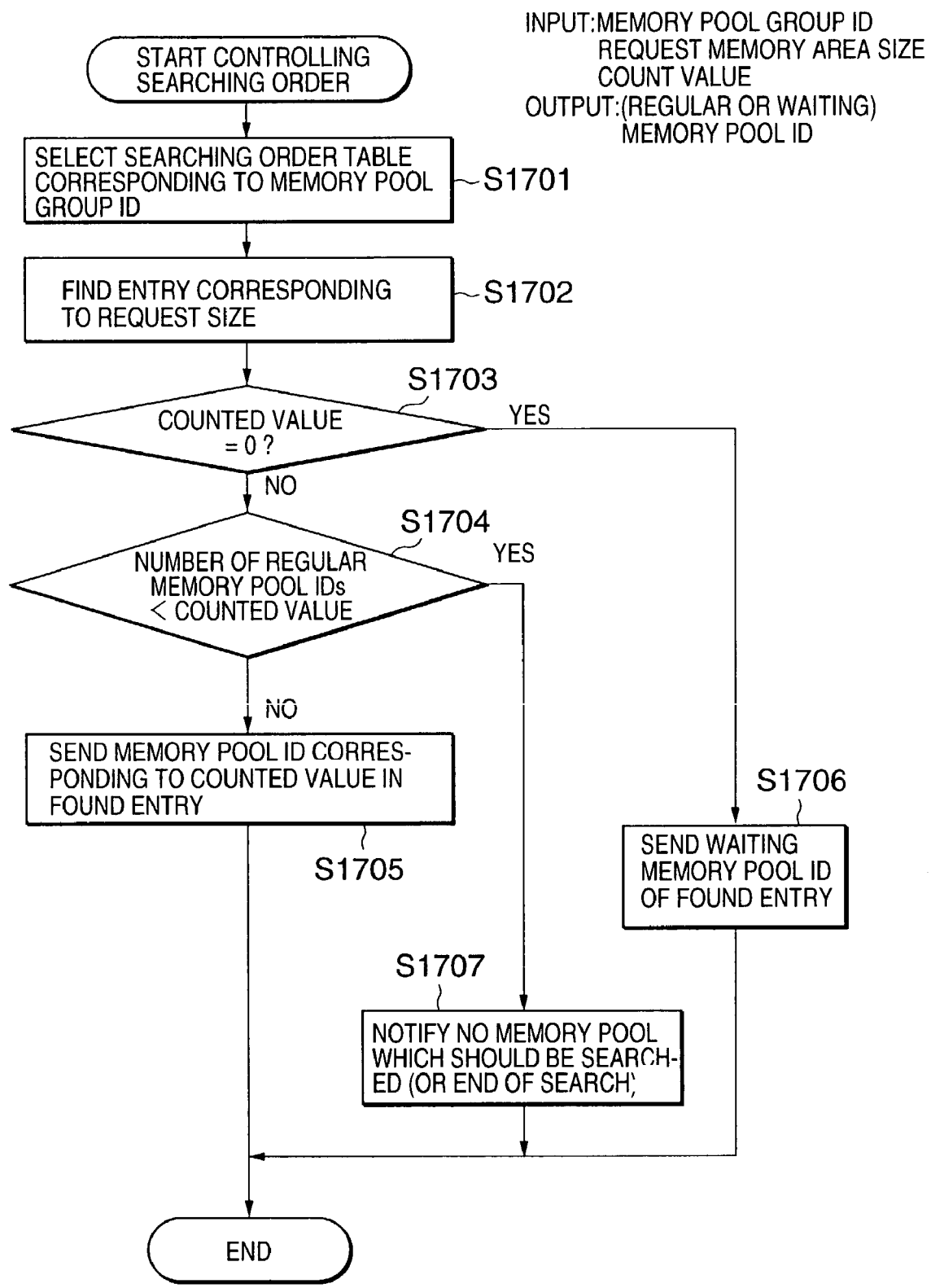
FIG. 17 is a flowchart for describing of an operation of a searching order control portion provided in the memory pool management system of FIG. 12.

When the searching order control portion 1201 receives the memory pool group ID, the request memory area size and the counted value from the memory getting request receiving portion 1202, it operates as illustrated in FIG. 17.

In a step S1701, the searching order control portion 1201 selects one of the searching order tables on the basis of the memory pool group ID sent from the memory getting request receiving portion 1202.

Next, the searching order control portion 1201 finds one of the entries from the selected searching order table on the basis of the request memory area size sent from the memory getting request receiving portion 1202 in a step S1702.

Subsequently, the searching order control portion 1201 judges whether the counted value sent from the memory getting request receiving portion 1202 is equal to "0" or not. When the counted value is equal to "0", the searching order control portion 1201 sends the waiting memory pool ID of the found entry to the memory getting request receiving portion 1202 in a step S1706.

When the counted value is not equal to "0", the searching order control portion 1201 further judges whether the counted value is larger than the number of regular memory pool IDs of the found entry in a step S1704.

When the counted value is equal to or smaller than the number of the regular memory pool IDs of the found entry, the searching order control portion 1201 sends a corresponding memory pool ID corresponding to the counted value to the memory getting request receiving portion 1202 in a step S1705.

On the other hand, the counted value is larger than the number of the regular memory pool IDs of the found entry, the searching order control portion 101 notifies no memory pool which should be searched to the memory getting request receiving portion 1202 in a step S1707.

According to this embodiment, the memory management system does not have the problems which the variable length memory pool management system or the fixed length pool management system has. Therefore, the memory management system can use the memory efficiently. That is, the memory management system can suppress fragmentation of available memory areas and occurrence of the division disadvantage.

The fragmentation is difficult to occur because the searching order against the memory pools depends on the request memory area size and the memory pools in each memory pool group are localized with regard to size of secured memory areas.

The division disadvantage does not occur because the searching of the assignable memory area is executed against not only specific one of the memory pools but also the other memory pools entered in the searching order table.

While this invention has thus far been described in conjunction with the preferred embodiments thereof, it will readily be possible for those skilled in the art to put this invention into practice in various other manners. For example, the searching order control portion (101 or 1201), the memory getting request receiving portion (102 or 1202) and the memory release request receiving portion (103 or 1203) may be combined with memory management functions of an operating system different from the µITRON 3.0.

Furthermore, the memory pool management system may comprises a computer program product or a software. The computer program product is used in a computer and comprises computer readable instructions and a recording medium bearing the computer readable instructions. The instructions are adaptable to enable the computer to operate as mentioned above.

What is claimed is:

1. A memory pool management method for getting a memory area from a memory pool having a plurality of sub-memory pools, comprising the steps of:
   receiving a memory area getting request specifying a request memory area size from a task program;
   selecting a predetermined searching order from a table which stores a plurality of searching orders in which each of said plurality of searching orders stored in the table corresponds to a different request memory area size and each of said plurality of searching orders specifies a different sequence of searching each of the sub-memory pools, wherein the predetermined searching order that is selected from the table corresponds to the request memory area size of the memory area getting request that is received;
   searching said memory pool for an assignable memory area equal to or larger than the request memory area size of a sub-memory pool as a unit in the predetermined searching order that is selected from the table; and
   getting said memory area with the request memory area size from the assignable memory area if said assignable memory area is found in any one of said plurality of sub-memory pools,
   wherein each sub-memory pool of said memory pool does not overlap with another sub-memory pool.

2. A memory pool management method as claimed in claim 1, wherein the predetermined searching order that is selected from the table is selected from plural orders related to different size ranges predefined for classifying the request memory area size.

3. A memory pool management method as claimed in claim 1, wherein the method further comprises the step of:
   waiting until said assignable memory area appears in said memory pool if said assignable memory area is not found in said memory pool in the searching step.

4. A memory pool management method as claimed in claim 1, wherein said plurality of sub-memory pools correspond to memory pools defined by an operating system of µITRON 3.0.

5. The memory pool management method as claimed in claim 1, wherein each sub-memory pool of the memory pool is searched in the predetermined searching order that is selected from the table if the assignable memory area equal to or larger than the request memory area size that is received is not found in the plurality of sub-memory pools.

6. The memory pool management method as claimed in claim 1, wherein each of the plural search orders specifies a different sub-memory pool as a start location of searching each of the sub-memory pools, and the searching the memory pool begins at the sub-memory pool specified as the start location by the predetermined search order that is selected from the table.

7. A computer program product for use in a computer to get a memory area from a memory pool having a plurality of sub-memory pools, said computer program product comprising computer readable instructions and a recording medium bearing the computer readable instructions; the instructions being adaptable to enable said computer to operate according to the steps of:
   receiving a memory area getting request specifying a request memory area size from a task program;
   selecting a predetermined searching order from a table which stores a plurality of searching orders in which each of said plurality of searching orders stored in the table corresponds to a different request memory area size and each of said plurality of searching orders specifies a different sequence of searching each of the sub-memory pools, wherein the predetermined searching order that is selected from the table corresponds to the request memory area size of the memory area getting request that is received;
   searching said memory pool for an assignable memory area equal to or larger than the request memory area size of a sub-memory pool as a unit in the predetermined searching order that is selected from the table; and
   getting said memory area with the request memory area size from the assignable memory area if said assignable memory area is found in any one of said plurality of sub-memory pools,
   wherein each sub-memory pool of said memory pool does not overlap with another sub-memory pool.

8. A computer program product as claimed in claim 7, wherein the predetermined searching order that is selected from the table is selected from plural orders related to different size ranges predefined for classifying the request memory area size.

9. A computer program product as claimed in claim 7, wherein the instructions further comprises the step of:
   waiting until said assignable memory area appears in said memory pool if said assignable memory area is not found in said memory pool in the searching step.

10. A computer program product as claimed in claim 7, wherein said plurality of sub-memory pools correspond to memory pools defined by an operating system of µITRON 3.0.

11. The computer program product as claimed in claim 7, wherein each sub-memory pool of the memory pool is searched in the predetermined searching order that is selected from the table if the assignable memory area equal to or larger than the request memory area size that is received is not found in the plurality of sub-memory pools.

12. The computer program product as claimed in claim 7, wherein each of the plural search orders specifies a different sub-memory pool as a start location of searching each of the sub-memory pools, and the searching the memory pool begins at the sub-memory pool specified as the start location by the predetermined search order that is selected from the table.

13. A memory pool management system for getting a memory area from a memory pool having a plurality of sub-memory pools, said memory pool management system comprising:
- a getting request receiving portion that receives a memory area getting request specifying a request memory area size from a task program;
- a searching order control portion connected to said receiving portion that includes a table storing a plurality of searching orders in which each of said plurality of searching orders stored in the table corresponds to a different request memory area size and each of said plurality of searching orders specifies a different sequence of searching each of the sub-memory pools, said searching order control portion selecting a predetermined searching order from the table which corresponds to the request memory area size of the memory area getting request that is received from the getting request receiving portion and searching said memory pool for an assignable memory area equal to or larger than the request memory area size of a sub-memory pool as a unit in the predetermined searching order that is selected from the table; and
- a getting portion connected to said getting request receiving portion that gets said memory area with the request memory area size from a sub-memory pool corresponding to the predetermined searching order that is selected from the table by said searching order control portion if said assignable memory area is found in any one of said plurality of sub-memory pools,
- wherein each sub-memory pool of said memory pool does not overlap with another sub-memory pool.

14. A memory pool management system as claimed in claim 13, wherein the predetermined searching order that is selected from the table is selected from plural orders related to different size ranges predefined for classifying the request memory area size.

15. A memory pool management system as claimed in claim 13, wherein the memory pool management system further comprises:
- a waiting portion that waits until an assignable memory area equal to or larger than said request memory area size appears in said memory pool if said searching order control portion notifies an end of search to said getting request receiving portion.

16. A memory pool management system as claimed in claim 13, wherein said sub-memory pools correspond to memory pools defined by an operating system of μITRON 3.0.

17. The memory pool management system as claimed in claim 13, wherein each sub-memory pool of the memory pool is searched in the predetermined searching order that is selected from the table if the assignable memory area equal to or larger than the request memory area size that is received is not found in the plurality of sub-memory pools.

18. The memory pool management system as claimed in claim 13, wherein each of the plural search orders specifies a different sub-memory pool as a start location of searching each of the sub-memory pools, and the searching the memory pool begins at the sub-memory pool specified as the start location by the predetermined search order that is selected from the table.

* * * * *